United States Patent [19]

Archambo

[11] Patent Number: 5,767,905
[45] Date of Patent: Jun. 16, 1998

[54] VIDEO CAMERA PERISCOPE AND MONITOR SURVEYING DEVICES FOR THE HANDICAPPED

[76] Inventor: Michael Archambo, 19111 Newland St., Huntington Beach, Calif. 92646

[21] Appl. No.: 628,525

[22] Filed: Apr. 5, 1996

[51] Int. Cl.$^6$ ............................................. H04N 5/225
[52] U.S. Cl. ............................................. 348/373; 396/428
[58] Field of Search ................................ 348/373, 214,
348/376, 375, 211, 135, 207, 143, 208,
219; 455/97; 297/463.1, 463.2; 248/125.9,
917, 288.31, 181.1; 280/304.1, 200, 250.1,
647; 296/156; 414/408; 5/658; 340/825.19,
407.1; 434/112; 396/419, 428; H04N 5/225

[56] References Cited

U.S. PATENT DOCUMENTS

| | | | |
|---|---|---|---|
| D. 266,119 | 9/1982 | Larsen | D6/64 |
| 4,016,583 | 4/1977 | Yeates | 248/181.1 X |
| 4,266,825 | 5/1981 | Le Donne | 297/194 |
| 5,172,147 | 12/1992 | Rockhill | 396/428 |
| 5,434,614 | 7/1995 | Dainty | 348/373 X |
| 5,476,241 | 12/1995 | Helman | 248/304.1 X |

Primary Examiner—Andrew Faile
Assistant Examiner—Jacqueline Wilson

[57] ABSTRACT

A video camera periscope device including a micro-video camera mounted above an arm of a chair. The camera has a bottom side with a coupling structure. Included is a monitor with a viewing screen, and is coupled to a forward end of the arm of the chair. The monitor has a mounting bracket securing it to the arm of the chair. Also, a telescoping arm is provided. The telescoping arm has a base member that is coupled to the arm of the chair. The telescoping arm is formed of three elongated tubular members. The three tubular members have an upper tubular member, a lower tubular member and a middle tubular member. The lower tubular member is coupled with the base member. The upper tubular member has an upper socket cup at one end and an external flange at another end. The socket cup, at the one end of the upper tubular member, receives the coupling structure of the video camera, and allows rotation thereof. Lastly, a telescoping arm control switch is coupled to the arm of the chair to control the movement of the video camera.

1 Claim, 3 Drawing Sheets

VIDEO CAMERA PERISCOPE AND MONITOR SURVEYING DEVICES FOR THE HANDICAPPED

BACKGROUND OF THE INVENTION

1. Field of the Invention

The present invention relates to a video camera periscope device and more particularly pertains to allowing a micro-video camera in association with a telescoping, rotatable upstanding support pole to receive images for displaying on a monitor, and further having the support pole and monitor coupled to the arm of a chair.

2. Description of the Prior Art

The use of video cameras is known in the prior art. More specifically, video cameras heretofore devised and utilized for the purpose of surveillance and general viewing are known to consist basically of familiar, expected, and obvious structural configurations, notwithstanding the myriad of designs encompassed by the crowded prior art which has been developed for the fulfillment of countless objectives and requirements.

By way of example, U.S. Pat. No. 5,289,321 to Secor discloses a consolidated rear view camera and display system for motor vehicles. U.S. Pat. No. 5,012,335 to Cohodar discloses an observation and recording system for a police vehicle. U.S. Pat. No. 4,344,092 to Miller discloses a miniature video camera means for video system. U.S. Pat. No. 4,288,814 to Talley and Tolbert discloses a closed circuit video guidance system for farming vehicles and method. U.S. Pat. No. 4,277,804 to Robison discloses a system for viewing the area rearwardly of a vehicle. Lastly, U.S. Pat. No. 4,214,266 to Myers discloses a rear viewing system for vehicles.

While these devices fulfill their respective, particular objectives and requirements, the aforementioned patents do not describe video camera periscope device that allows a person confined to a chair or wheelchair to view the activities, going on around the person in all directions, through the use of the micro-video camera mounted on a telescoping arm that is coupled to the arm of the chair.

In this respect, the video camera periscope device according to the present invention substantially departs from the conventional concepts and designs of the prior art, and in doing so provides an apparatus primarily developed for the purpose of allowing a micro-video camera in association with a telescoping, rotatable upstanding support pole to receive images for displaying on a monitor, and further having the support pole and monitor coupled to the arm of a chair.

Therefore, it can be appreciated that there exists a continuing need for a new and improved video camera periscope device which can be used for allowing a micro-video camera in association with a telescoping, rotatable upstanding support pole to receive images for displaying on a monitor, and further having the support pole and monitor coupled to the arm of a chair. In this regard, the present invention substantially fulfills this need.

SUMMARY OF THE INVENTION

In view of the foregoing disadvantages inherent in the known types of video cameras now present in the prior art, the present invention provides an improved video camera periscope device. As such, the general purpose of the present invention, which will be described subsequently in greater detail, is to provide a new and improved video camera periscope device and method which has all the advantages of the prior art and none of the disadvantages.

To attain this, the present invention essentially comprises a micro-video camera that is mounted above an arm of a chair. The camera receives an image through a lens member that is located on a front of the camera. The camera has bottom side with a coupling structure attached. The coupling structure is capable of allowing vertical and horizontal movement of the video camera with respect to the arm of the chair. Included is a generally rectangular monitor that is coupled to a forward end of the arm of the chair. The monitor has a mounting bracket attached to a bottom side of the monitor. The mounting bracket secures the monitor to the arm in a stationary position. The monitor has a viewing screen that is capable of projecting images that are received from the video camera. Also, a telescoping arm is provided. The telescoping arm has a base member that is coupled to the arm of the chair. The telescoping arm is positioned on the arm of the chair between the monitor and a chair back. The base member has an output cable that is connected to the monitor. The output cable transmits a video signal to the monitor for viewing on the viewing screen. The telescoping arm is formed of three elongated tubular members. The three tubular members have an upper tubular member, a lower tubular member and a middle tubular member therebetween. The lower tubular member is coupled with the base member at a proximal end. The lower tubular member is capable of having the middle tubular member nested therein. The middle tubular member projects upwardly from an opening at a distal end of the lower tubular member. Additionally, the upper tubular member has an upper socket cup at one end and an external flange at another end. The upper tubular member is capable of nesting within the middle tubular member. The external flange of the upper tubular member is capable of engaging an internal flange of the middle tubular member, when the upper tubular member is extended from within the middle tubular member. The socket cup, at the one end of the upper tubular member, is capable of receiving the coupling structure of the video camera. The socket cup is capable of allowing the coupling structure to rotate 360 degrees therein for movement of the video camera. Lastly, a telescoping arm control switch is coupled to the arm of the chair. The control switch has a dial for controlling the movement of the video camera about the coupling structure. Whereby, a person seated in the chair, is capable of viewing various activities therearound on the monitor by turning the video camera towards the direction of the activity.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved video camera periscope device which has all of the advantages of the prior art video cameras and none of the disadvantages.

It is another object of the present invention to provide a new and improved video camera periscope device which may be easily and efficiently manufactured and marketed.

It is further object of the present invention to provide a new and improved video camera periscope device which is of durable and reliable constructions.

An even further object of the present invention is to provide a new and improved video camera periscope device which is susceptible of a low cost of manufacture with regard to both materials and labor, and which accordingly is then susceptible of low prices of sale to the consuming public, thereby making such video camera periscope device economically available to the buying public.

Still yet another object of the present invention is to provide a new and improved video camera periscope device which provides in the apparatuses and methods of the prior art some of the advantages thereof, while simultaneously overcoming some of the disadvantages normally associated therewith.

Even still another object of the present invention is to provide a video camera periscope device for allowing a micro-video camera in association with a telescoping, rotatable upstanding support pole to receive images for displaying on a monitor, and further having the support pole and monitor coupled to the arm of a chair.

Lastly, it is an object of the present invention to provide a new and improved video camera periscope device including a micro-video camera that is mounted above an arm of a chair. The camera has a bottom side with a coupling structure attached. Included is a monitor that has a viewing screen, and is coupled to a forward end of the arm of the chair. The monitor has a mounting bracket that secures the monitor to the arm of the chair. Also, a telescoping arm is provided. The telescoping arm has a base member that is coupled to the arm of the chair. The telescoping arm is formed of three elongated tubular members. The three tubular members have an upper tubular member, a lower tubular member and a middle tubular member therebetween. The lower tubular member is coupled with the base member. The upper tubular member has an upper socket cup at one end and an external flange at another end. The socket cup at the one end of the upper tubular member is capable of receiving the coupling structure of the video camera, and allowing rotation thereof. Lastly, a telescoping arm control switch is coupled to the arm of the chair. The control switch has a dial for controlling the movement of the video camera about the coupling structure.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
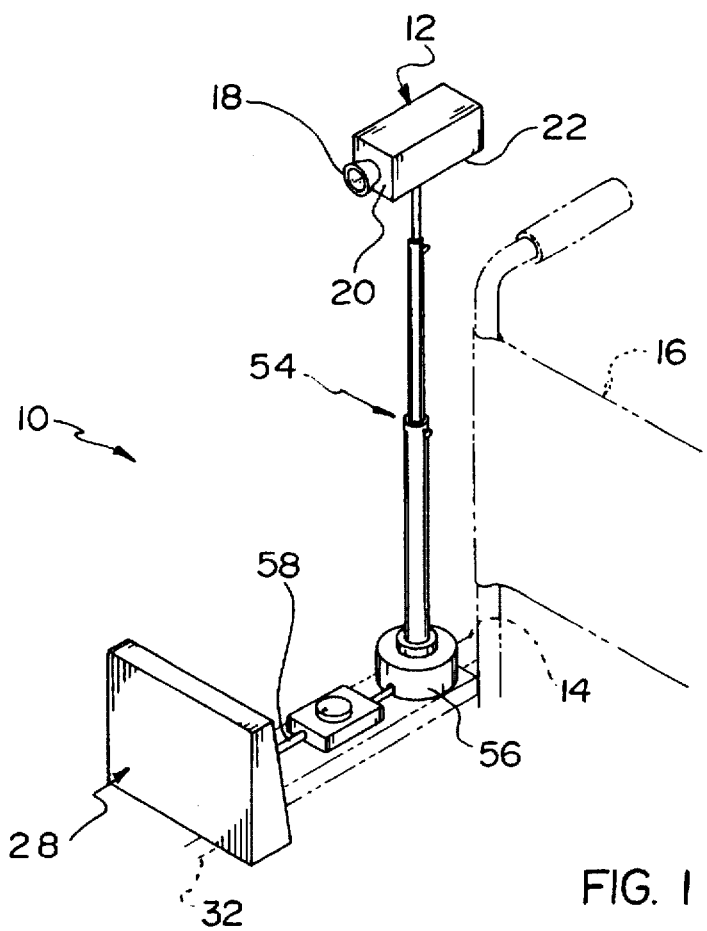
FIG. 1 is a perspective view of the preferred embodiment of the video camera periscope device constructed in accordance with the principles of the present invention.

With reference now to the drawings, and in particular to FIG. 1 thereof, the preferred embodiment of the new and improved video camera periscope device embodying the principles and concepts of the present invention and generally designated by the reference numeral 10 will be described.

The present invention, the video camera periscope device 10 is comprised of a plurality of components. Such components in their broadest context include a camera, a monitor and a telescoping arm. Such components are individually configured and correlated with respect to each other so as to attain the desired objective.

Figure 4:
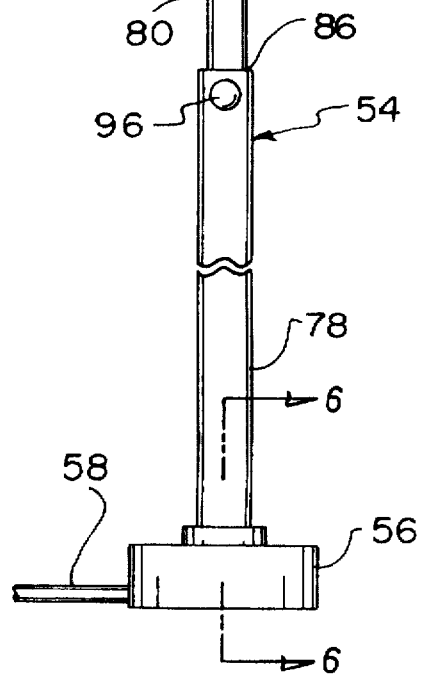
FIG. 4 is a side elevational view of the telescoping arm of the present invention in an operable configuration.

Specifically, the present invention includes a micro-video camera 12 of the type which are well-known and commercially available. The video camera is mounted above an arm 14 of a chair 16. FIG. 1 depicts the chair as a wheelchair. The present invention is not restricted to use only with a wheelchair. It is to understood that the main function of the present invention is to assist the handicapped. But, the invention may be useful to others, such as law enforcement. The camera receives an image through a lens member 18 located on a front of the camera. The camera has a bottom side 22 with a coupling structure 24 attached, as seen in FIG. 4. The coupling structure is capable of allowing vertical and horizontal movement of the video camera with respect to the arm of the chair 16. The camera is powered by any commercially available source that is currently in use with this type of camera.

Figure 2:
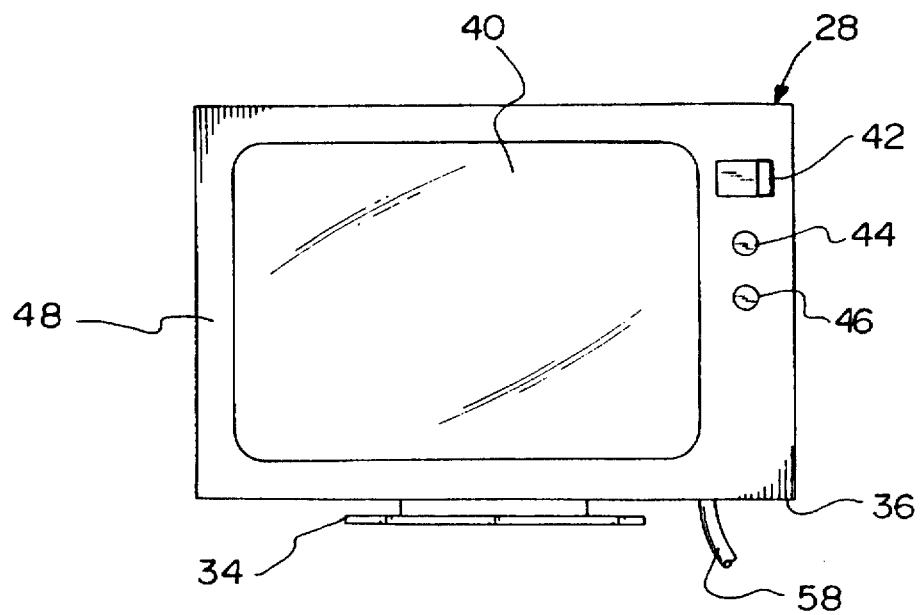
FIG. 2 is an enlarged frontal view of the monitor of the present invention.

As best illustrated in FIG. 2, a generally rectangular monitor 28 is provided. The monitor is coupled to a forward end 32 of the chair 16 arm 14. The monitor is any commercially available monitor that is currently in the market place. The monitor has a mounting bracket 34 attached to a bottom side 36 of the monitor. The mounting bracket is capable of securing the monitor to the arm 14 in a stationary position, as shown in FIG. 1. The monitor has a viewing screen 40 that is capable of projecting images that are received from the video camera. The monitor is controlled by an on and off slid switch 42. A volume control 44 and sharpness control 46 are each positioned on the front 48 of the monitor.

Also, a telescoping arm 54 with a base member 56 is coupled to the arm of the chair. The telescoping arm is formed of metal or a metal alloy. The telescoping arm has a maximum height of about twenty-four inches. The telescoping arm is positioned on the arm of the chair between the monitor and a chair back, as seen in FIG. 1. The base member has an output cable 58 that is connected to the monitor 28.

Figure 6:
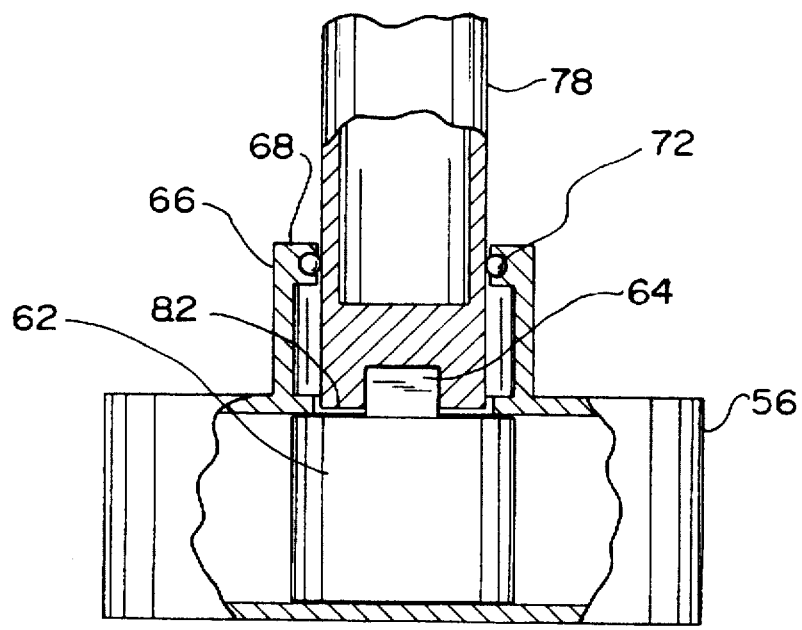
FIG. 6 is a cut-away cross sectional view taken along line 6—6 of FIG. 4.

The output cable is a coaxial cable and capable of transmitting a video signal to the monitor. The signal is turned into a picture for viewing on the viewing screen. The base member, as seen in FIG. 6, has a coupler member 62 contained therein. The coupler member has a projection portion 64 projecting into an upper ring 66 of the base member. The upper ring is interconnected to the base member. The upper ring has a sealing flange 68 with an O-ring 72 therein. The O-ring ensures frictionless contact between the ring and telescoping arm, while ensuring a snug fit.

The telescoping arm 54 is formed of three elongated tubular members. The three tubular members have an upper tubular member 76, a lower tubular member 78 and a middle tubular member 80 therebetween. The lower tubular member is coupled with the base member 56 at a proximal end 82. The proximal end of the lower tubular member receives the projection portion of the coupler member 62. The coupler member allows the telescoping arm to lock within the base and project vertically upward from the base. The lower tubular member, as seen in FIG. 4, has the middle tubular nested within. The middle tubular member projects upwardly from an opening at a distal end 86 of the lower tubular member.

Figure 5:
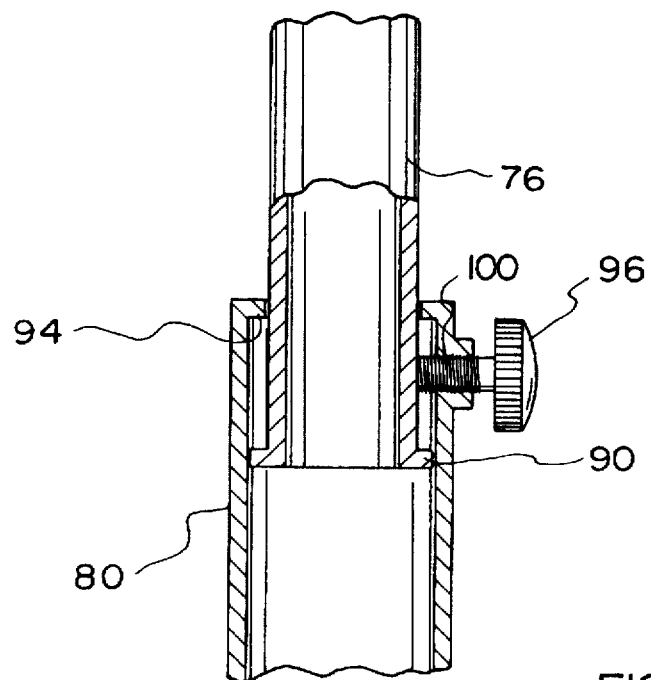
FIG. 5 is a cut-away cross sectional view taken along line 5—5 of FIG. 4.

Additionally, the upper tubular member 76 has an upper socket cup 88 at one end and an external flange 90 at another end. The upper socket cup and the external flange are each interconnected to the body of the upper tubular member. The upper tubular member is capable of nesting within the middle tubular member 80, as seen in FIG. 5. The external flange of the upper tubular member is capable of engaging an internal flange 94 of the middle tubular member, when the upper tubular member is extended from within the middle tubular member. Each tubular member is manually slid up and down within the complimentary tubular member. A pair of thumb screws 96 are used, once a desired height is reached, to lock each tubular member within one other tubular member. The thumb screws threadedly engage an upper threaded opening 100 in the lower tubular member and the middle tubular member. FIG. 5 shows the thumb screw of the middle tubular member locking the upper tubular member in position.

The socket cup 88, at the one end of the upper tubular member 76, is capable of receiving the coupling structure 24 of the video camera. The socket cup allows the coupling structure to rotate 360 degrees therein for movement of the video camera. Rotation of the camera is important to the person sitting in the chair. When the video camera is rotated, the telescoping arm remains locked in the vertical position.

Figure 3:
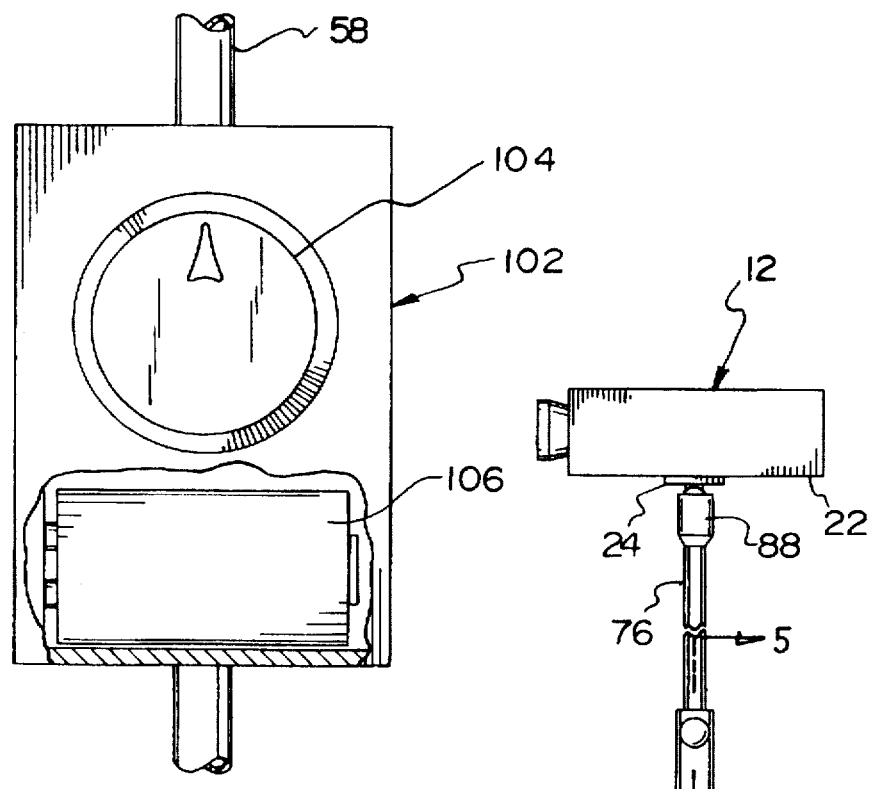
FIG. 3 is an enlarged top plan view of the telescoping arm control switch.

Lastly, a telescoping arm control switch 102 is provided. The control switch is coupled to the arm of the chair 16. The control switch has a dial 104 for controlling the movement of the video camera about the coupling structure 24, and within the upper socket cup 88. The telescoping arm control switch has a separate power source. The power source is a battery 106 that is housed within the telescoping arm control switch, as seen in FIG. 3. Whereby, a person sitting in the chair, is capable of viewing various activities therearound, on the monitor by turning the video camera towards the direction of the activity.

The present invention is an easy to use video camera periscope device. The invention may be attached to a chair or wheelchair, and powered by any commercially available power source that is currently in the market place. When the invention is coupled with the arm of the wheelchair, it allows the wheelchair occupant to view the activities in the crowd around him or her from any direction. The present invention is easy to use and attachable to wheelchairs or the arm of any chair. The video camera periscope device allows the seated person to see over crowds, windows and behind theirselves while remaining seated. The present invention can also be attached to a video camera for better camera shots, instead of holding the camera overhead.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved video camera periscope and monitor surveying device for the handicapped for use as a visual aid for persons restricted to a seated position comprising in combination:

a micro video camera capable of being mounted above an arm of a chair, the camera being capable of receiving an image through a lens member located on a front of the camera, the camera having a bottom side with a coupling structured attached thereto, the coupling structure being capable of allowing vertical and horizontal movement of the video camera with respect to the arm of the chair;

a generally rectangular monitor being coupled to a forward end of the arm of the chair, the monitor having a mounting bracket attached to a bottom side of the monitor, the mounting bracket being capable of securing the monitor to the arm in a stationary position, the monitor having a viewing screen being capable of projecting images being received from the video camera, the monitor being controlled by an on and off slid switch, the monitor having a front with a volume control and sharpness control positioned thereon;

a telescoping arm having a base member being coupled to the arm of the chair, the telescoping arm being positionable on the arm of the chair between the monitor and a chair back, the telescoping arm having a maximum height of twenty-four inches, the base member having an output cable being connected to the monitor, the output cable being capable of transmitting a video signal to the monitor for viewing on the viewing screen, the base member having a coupler member contained therein with the coupler member having a projection portion, the base member having an upper ring interconnected thereto, the projection portion projecting into the upper ring of the base member, the upper ring having a sealing flange with an O-ring for ensuring frictionless contact between the ring and the telescoping arm and ensuring a snug fit;

the telescoping arm being formed of three elongated tubular members, the three tubular members having an upper tubular member, a lower tubular member and a middle tubular member therebetween, the lower tubular member being coupled with the base member at a proximal end thereof, the proximal end of the lower tubular member receiving the projection portion of the coupler member, the coupler member, having the projection portion within the lower tubular member, allowing the telescoping arm to lock within the base and project vertically upward from the base, the lower tubular member being capable of having the middle tubular member nested therein, the middle tubular member being capable of projecting upwardly from an opening at a distal end of the lower tubular member;

the upper tubular member having an upper socket cup at one end and an external flange at another end, the upper tubular member being capable of nesting within the middle tubular member, the external flange of the upper tubular member being capable of engaging an internal flange of the middle tubular member when being extending from within the middle tubular member, the socket cup at the one end of the upper tubular member being capable of receiving the coupling structure of the video camera therein, the socket cup being capable of allowing the coupling structure to rotate 360 degrees therein for movement of the video camera; and a telescoping arm control switch being coupled to the arm of the chair, the control switch having a dial for controlling the movement of the video camera about the coupling structure, whereby a person seated in the chair, being capable of viewing various activity therearound on the monitor by turning the video camera towards the direction of the activity.

* * * * *